United States Patent [19]
Kato et al.

[11] 3,873,886

[45] Mar. 25, 1975

[54] DEVICE FOR PREVENTING ACCUMULATION OF STATIC ELECTRICITY ON A SPINDLE AND BEARING ASSEMBLY THEREOF

[75] Inventors: Takashi Kato, Kariya; Yoshihisa Suzuki, Nagoya, both of Japan

[73] Assignees: Kabushiki Kaisha Toyoda Jidoshokki Seisakusho, Kariya-shi, Aichi-ken; Daiwa Boseki Kabushiki Kaisha, Osaka, both of Japan

[22] Filed: Nov. 14, 1973

[21] Appl. No.: 415,564

[30] Foreign Application Priority Data
Nov. 24, 1972 Japan.............................. 47-135281

[52] U.S. Cl................................... 317/2 R, 308/26
[51] Int. Cl............................................. H05f 3/00
[58] Field of Search................ 317/2 R; 310/90, 91; 308/26

[56] References Cited
UNITED STATES PATENTS

| | | | |
|---|---|---|---|
| 2,256,118 | 9/1941 | Kyropoulos | 317/2 R |
| 2,291,623 | 8/1942 | Hanson et al. | 317/2 R |
| 2,390,905 | 12/1945 | Wening et al. | 317/2 R |
| 3,711,168 | 1/1973 | Wendel et al. | 308/26 |

Primary Examiner—J. D. Miller
Assistant Examiner—Harry E. Moose, Jr.

[57] ABSTRACT

In a spindle assembly driven by a driving belt wherein a non-conductive resiliently yieldable member is interposed between a bearing assembly rotatably supporting a spindle and a bushing member enveloping the bearing assembly, a conductive resilient member connects the bushing member with the bearing assembly and the bushing member is rigidly mounted on a machine frame which is connected to the earth. The static electricity created by the slip or frictional contact between the spindle and the driving belt is allowed to escape to the earth via the bearing assembly, the bushing member and the machine frame.

8 Claims, 7 Drawing Figures

DEVICE FOR PREVENTING ACCUMULATION OF STATIC ELECTRICITY ON A SPINDLE AND BEARING ASSEMBLY THEREOF

SUMMARY OF THE INVENTION

The present invention relates to a device for preventing accumulation of static electricity on a spindle which is rotatably supported by a bearing assembly enveloped by a bushing member secured to a machine frame or frame support by way of a non-conductive resiliently yieldable member interposed between the bushing member and the bearing assembly.

It has become a recent tendency in industry to attempt to attain the maximum possible machine efficiency during machine operation by increasing the rotational speeds of driving mechanisms or increasing the capacity of the machines so that the load capability of the machines is increased. Consequently, some serious problems with respect to noise or vibration of machine parts, have arisen. One of the solutions of the above-mentioned problems is the utilization of a resiliently yieldable member interposed between the bearing assembly of a rotatable member and the bushing member enveloping the bearing assembly so that transmission of the vibration of the rotatable member to other machine parts can be satisfactorily prevented and, further, the creation of noise due to the high speed rotation of the rotatable member is effectively reduced. For example, Wendel, et al., invented an apparatus for mounting a spinning turbine comprising a bushing member secured to the machine frame or frame support and a resiliently yieldable member interposed between the bushing member and a surface of the assembly (U.S. Pat. No. 3,711,168). However, in the case of driving a driving mechanism such as a spindle or shaft by means of a belt driving system, static electricity is created because of the frictional contact or slip between the spindle or shaft and the driving belt. If the spindle or shaft and the bearing assembly are insulated from the bushing member by means of a non-conductive resiliently yieldable member, the static electricity tends to accumulate on the spindle or shaft or the bearing assembly. Consequently, the peripheral surface of the spindle or shaft or the bearing assembly is damaged by discharge of the static electricity accumulated in a small clearance between the shaft or bearing and the bushing member. Further, the life of machine elements such as ball bearings exposed to the above-mentioned discharge of the static electricity is considerably shortened. According to our experience, when the intensity of the above-mentioned accumulated static energy goes over a certain limit, the accumulated static electricity is discharged at a place where the clearance is very small. Consequently, if the above-mentioned discharge of the static electricity occurs at a place where an inflammable material such as flies of textile fibers is deposited, there is a certain possibility of fire.

Recently, a reinforced synthetic belt comprising a nylon fabric covered by a synthetic rubber sheet has been preferably utilized for driving spindles by direct contact so as to attain very high speed in driving the spindles. However, as the spindles are normally made of metallic material, the above-mentioned trouble concerning static electricity has become a very serious problem which urgently requires solution.

The principal object of the present invention is to eliminate the above-mentioned serious problem caused by the accumulation of static electricity on the rotating spindle and the bearing assembly. Consequently, in the device for preventing the accumulation of static electricity on the spindle and the bearing assembly according to the present invention, the bearing assembly, which is insulated by a non-conductive resiliently yieldable member interposed between the bearing assembly and the bushing member supporting the bearing assembly, is connected to the bushing member by a flexible material having good conductive property. This allows the escape of the static electricity accumulated on the spindle and bearing assembly thereof to the bushing member via the conductive flexible or yieldable member. Consequently, the above-mentioned drawbacks due to the utilization of the non-conductive resiliently yieldable member on the assembly of the rotatable spindle or like member can be perfectly eliminated.

The detailed construction and other characteristic features of the device according to the present invention are hereinafter described in detail with reference to the accompanied drawings.

DETAILED EXPLANATION OF THE INVENTION

Figure 1:
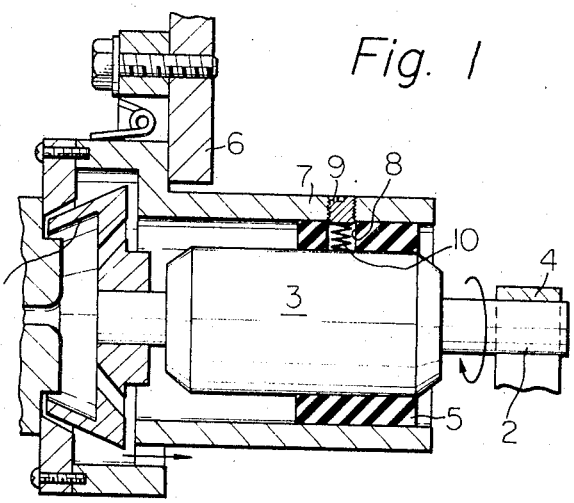
FIG. 1 is a cross sectional side view of a main part of a spindle assembly utilized for an open-end spinning device, wherein a device for preventing accumulation of static electricity is applied according to the present invention.

Referring to FIG. 1, wherein a device for preventing accumulation of static electricity according to the present invention is applied, a spindle 2 is rotatably supported by a bearing 3.

A spinning rotor 1 is ridigly mounted at the end of the spindle 2 and another end of the spindle 2 is in contact with a driving belt 4 so that the spindle 2 is rotated at high speed together with the spinning rotor 1. The bearing 3 is supported by a bushing member 7 pivotably mounted on a machine frame 6 and a non-conductive resiliently yieldable member 5 is interposed between the bushing member 7 and the bearing 3 so that the vibration of the spindle 2 or the bearing 3 is absorbed in or prevented by the resiliently yieldable member 7. In other words, the above-mentioned vibration of the spindle 2 is not transmitted to the bushing member 7 and then to the machine frame 6. On the other hand, a common aperture 8 is formed in the resiliently yieldable member 5 and the bushing member 7, and a part of the common aperture 8 formed in the bushing member 7 is provided with a thread for engaging with a threaded member 9 so that the aperture 8 is closed by the threaded member 9. A helical spring 10 is disposed in a free space of the aperture 8 in such a way that one end of the spring 10 contacts the threaded member 9 while the other end of the spring 10 contacts the bearing 3 in compressed condition. Consequently, the static electricity created by the frictional contact or the slip between the spindle 2 and the driving belt 4 is allowed to escape to the machine frame 6, which is connected to the ground, via the spindle 2, the bearing 3, the helical spring 10, the threaded member 9 and the bushing member 7. To attain the above-mentioned effect all the members except the non-conductive resiliently yieldable member 5 are of course made of conductive material. Consequently, the accumulation of static electricity on the spindle 2 or the bearing 3 can be perfectly prevented. In the above-mentioned embodiment, the vibration of the spindle 2 and the bearing 3 is not transmitted to the bushing member 7 and the machine frame 6 because of the resilient property of the resiliently yieldable member 5 and the helical spring 10.

Figure 2:
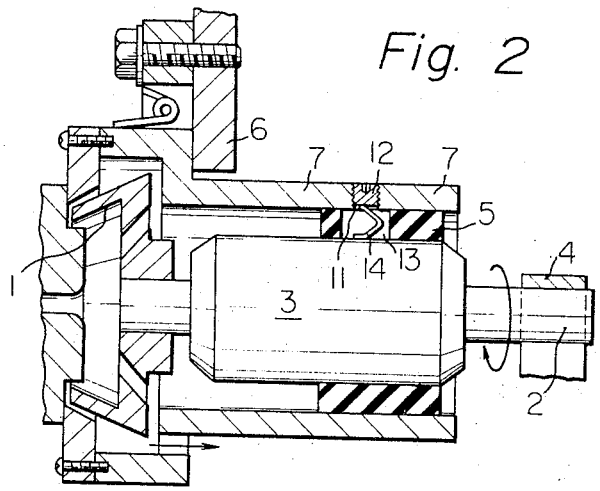
FIGS. 2, 3, 4, 5, 6 and 7 are cross sectional side views of a main part of the spindle assembly for an open-end spinning device, wherein modified devices for preventing accumulation of static electricity according to the present invention are applied respectively.

In the modified embodiment shown in FIG. 2, a plate spring or snap spring 14 is utilized instead of the helical spring 10. That is, a threaded aperture 11 is formed in the bushing member 7, and an aperture 13 is formed in the resiliently yieldable member 5 at a position facing the above-mentioned threaded aperture 11. The lateral diameter of the aperture 13 may be larger than the lateral diameter of the threaded aperture 11. The threaded aperture 11 is closed by a threaded member 12 engaged thereinto while the plate spring 14 is disposed in the aperture 13 in such a way that one end of the plate spring 14 contacts the threaded member 12 while the other end of the plate spring 14 contacts the bearing 3. Consequently, the same result as in the first embodiment shown in FIG. 1 can be expected.

Figure 3:
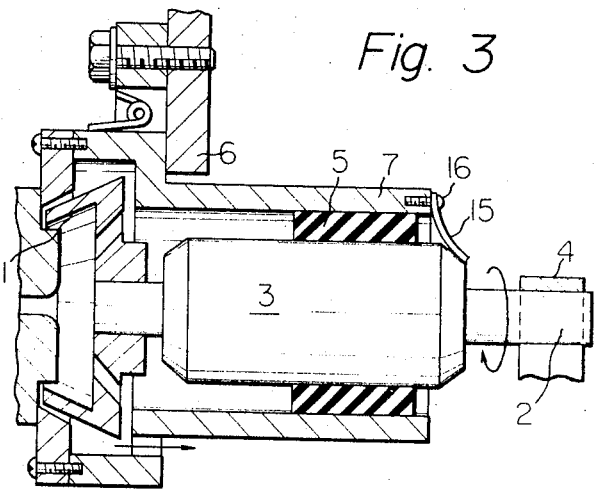

In the embodiment shown in FIG. 3, a plate spring 14 is utilized so as to create a conductive passage between the bushing member 7 and the bearing 3. That is, one end of the plate spring 15 is secured to an outside end of the bushing member 7 by a set screw 16 while the other end of the spring 15 resiliently contacts a part of the bearing 3. Consequently, the static electricity is allowed to escape to the bushing member 7 via the bearing 3 and the plate spring 15 so that accumulation of static electricity on the spindle 2 and the bearing 3 is prevented. Further, the vibration of the spindle 2 and the bearing 3 is absorbed by the resiliently yieldable member 5 and the plate spring 15 so that the vibration is not transmitted to the bushing member 7.

Figure 4:
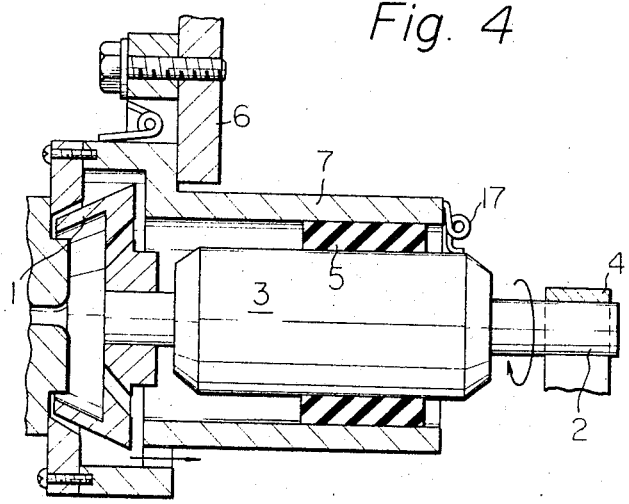

In the embodiment shown in FIG. 4, a flexible spring 17 is utilized instead of the plate spring 15 shown in FIG. 3. The two end portions of the spring 17 are fixed to a part of the bearing 3 and the bushing member 7, respectively, by means of welding or soldering. According to our mill test, a result quite similar to the above-mentioned two embodiments was confirmed.

Figure 5:
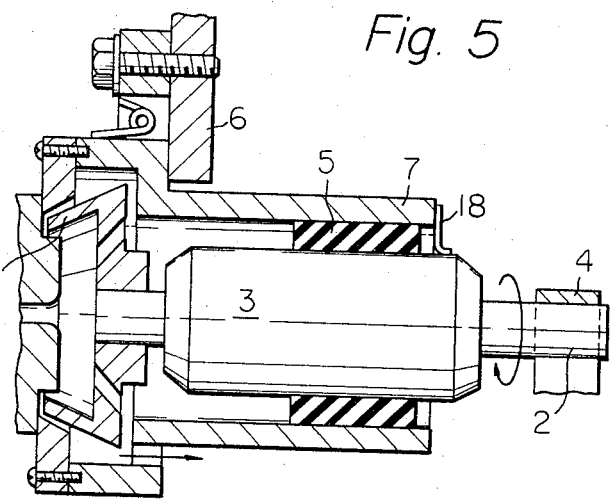

Instead of the flexible spring 17 shown in FIG. 4, the two ends of a flexible tape 18, which contains a large amount of metallic powder or is coated with metallic powder so as to create a good conductive property, are fixed to the bushing member 7 and the bearing 3, respectively, as shown in FIG. 5. It was confirmed that this embodiment creates the same effect as the embodiment shown in FIG. 4. In this embodiment, the tape 18 is fixed to the bushing member 7 and the bearing 3 by screw setting or bonding.

Figure 6:
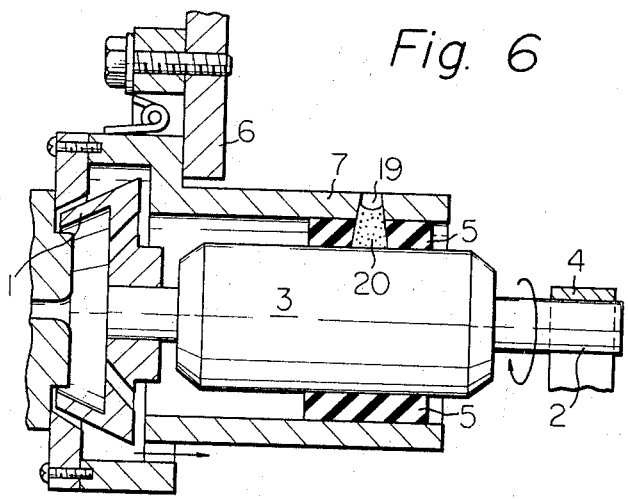

Another modification of the device according to the present invention is shown in FIG. 6. In this embodiment, a common tapered aperture 19 is formed in the bushing member 7 and the resiliently yieldable member 5 and the lateral cross section of the aperture 19 becomes larger toward the bearing 3. A conductive paint material 20, which contains a large quantity of a conductive substance such as carbon particles or silver particles, is poured into the aperture 19 and then the paint material 12 is solidifed by drying. This paint material 12, in solidified conditions, still retains its flexibility. Consequently, the static electricity created by the frictional contact or slip between the spindle 2 and the driving belt 4 is allowed to escape to the bushing member 7 through the paint material 12, while the vibration of the spindle 2 and the bearing 3 is absorbed into the resiliently yieldable member 5 and the paint material 20. The shape of the common aperture 19 of this embodiment may be changed in so far as the paint material 20 can be held therein.

Figure 7:
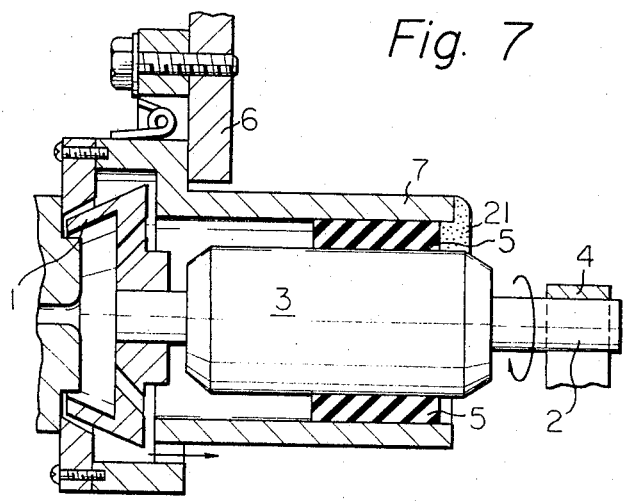

An embodiment shown in FIG. 7 is a modification of the embodiment shown in FIG. 6, wherein a conductive substance 21 having a composition similar to the paint material 20 is poured into end portions of the bushing member 7 and the bearing 3 instead of the paint material 20 in the embodiment shown in FIG. 6. According to the application of this embodiment, the same result as the embodiment shown in FIG. 6 can be expected.

In the above-mentioned embodiments, the device for preventing accumulation of the static electricity is adopted to the spindle assembly of the open-end spinning apparatus. However, it is obvious that the device according to the present invention can be satisfactorily applied to the spindle assembly or the rotatable shaft assembly driven by a driving belt wherein the non-conductive resiliently yieldable member is adopted so as to prevent transmission of the vibration of the spindle or shaft to the bushing member supporting the spindle or shaft.

Further, it is important to realize that the device according to the present invention can be easily applied into a small space so that the utilization of the non-conductive resiliently yieldable member with the spindle assembly becomes remarkably effective.

What is claimed is:

1. In a device for supporting a spindle part of an open-end spinning device comprising a spindle and a spinning rotor rigidly mounted to an end of said spindle and a driving belt contacting another end of said spindle, wherein a bearing assembly rotatably supports the spindle or shaft, a bushing member envelops the bearing assembly, a machine frame rigidly supports the bushing member and is connected to the earth, and a non-conductive resiliently yieldable member is interposed between the bearing assembly and the bushing member, a device for preventing the accumulation of the static electricity created by the slip or frictional contact of said driving belt with said spindle on said bearing assembly and said spindle, comprising a conductive yieldable member connecting said bushing member and said bearing assembly in resilient condition, said bearing assembly and said bushing member being made of a conductive metallic material.

2. A device for preventing accumulation of static electricity on a spindle and bearing assembly thereof according to claim 1, wherein said bushing member and said non-conductive resiliently yieldable member are provided with a separate aperture passing therethrough respectively and facing each other so that a common aperture is formed thereby, said separate aperture of said bushing member is closed at an outside end portion thereof by a conductive closing member, said conductive yieldable member is disposed in a space formed in said common aperture restricted by said closing member in resilient condition, and said conductive yieldable member contacts said bushing member or closing member and said bearing assembly.

3. A device for preventing accumulation of static electricity on a spindle and bearing assembly thereof according to claim 2, wherein said conductive yieldable member is a compressive helical spring made of a conductive metallic material.

4. A device for preventing accumulation of static electricity on a spindle and bearing assembly thereof according to claim 2, wherein said conductive yieldable member is a flexible resilient metallic plate spring.

5. A device for preventing accumulation of static electricity on a spindle and bearing assembly thereof according to claim 1, wherein said bushing member and said non-conductive resiliently yieldable member are provided with a separate aperture passing therethrough respectively and facing each other so that a common aperture is formed thereby, said conductive yieldable member is a solidified paint material filled in said common aperture and said paint material contains a quantity of conductive substance sufficient to make said paint material conductive.

6. A device for preventing accumulation of static electricity on a spindle and bearing assembly thereof according to claim 1, wherein said conductive yieldable member is a plate spring secured to an outside end of said bushing member and a free end of said plate spring resiliently contacts a part of said bearing assembly.

7. A device for preventing accumulation of static electricity on a spindle and bearing assembly thereof according to claim 1, wherein said conductive yieldable member is a flexible spring with the two end portions thereof secured on said bushing member and a part of said bearing assembly, respectively.

8. A device for preventing accumulation of static electricity on a spindle and bearing assembly thereof according to claim 1, wherein said conductive yieldable member is a yieldable plate material with the two ends thereof secured on a part of said bushing member and a part of said bearing assembly, respectively.

* * * * *